May 18, 1948.  U. G. SMITH  2,441,726
ELECTRIC AIR CIRCULATING HEATER
Filed May 25, 1946  3 Sheets-Sheet 1

INVENTOR.
ULYSSES G. SMITH
BY
ATTORNEY

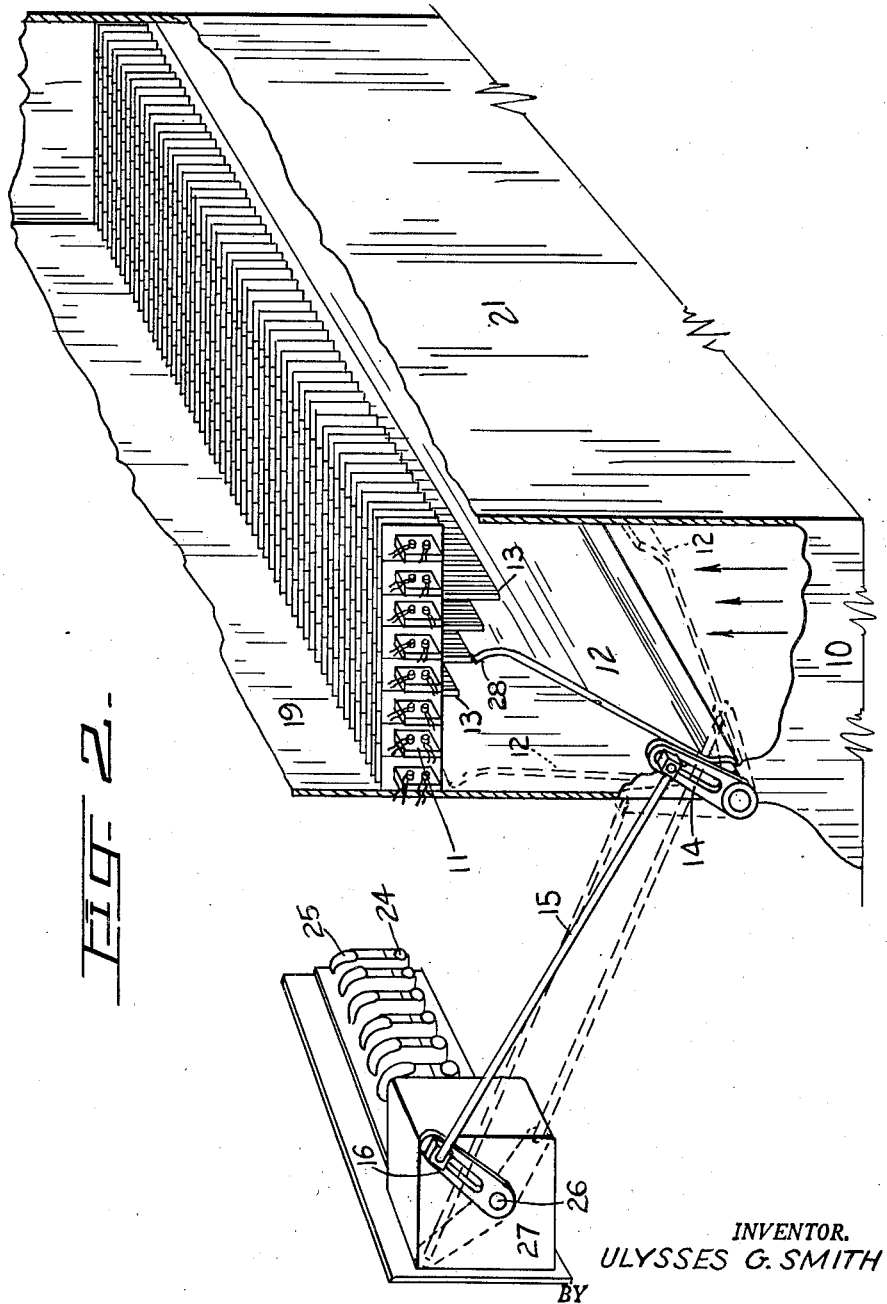

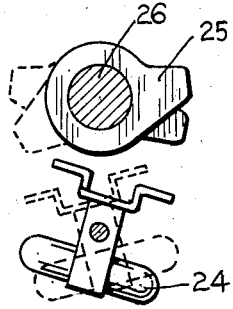
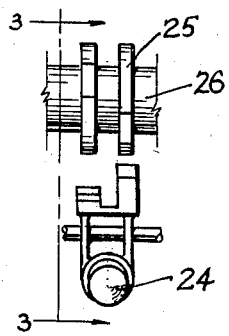
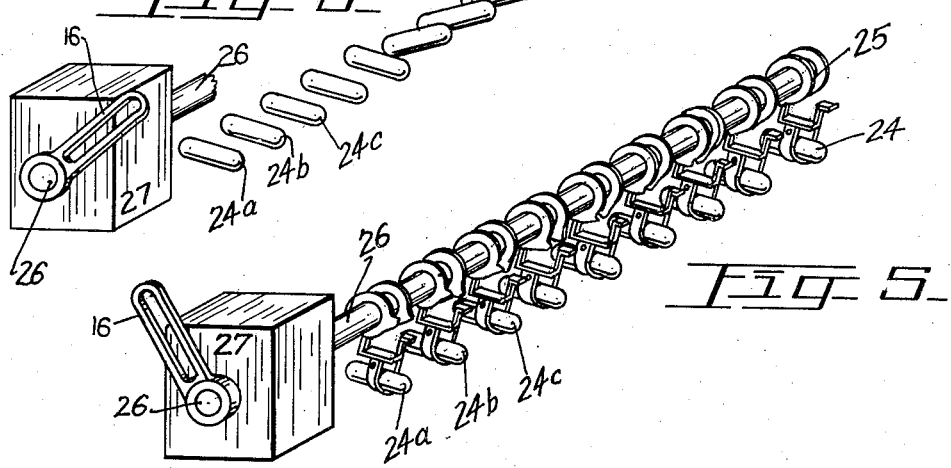
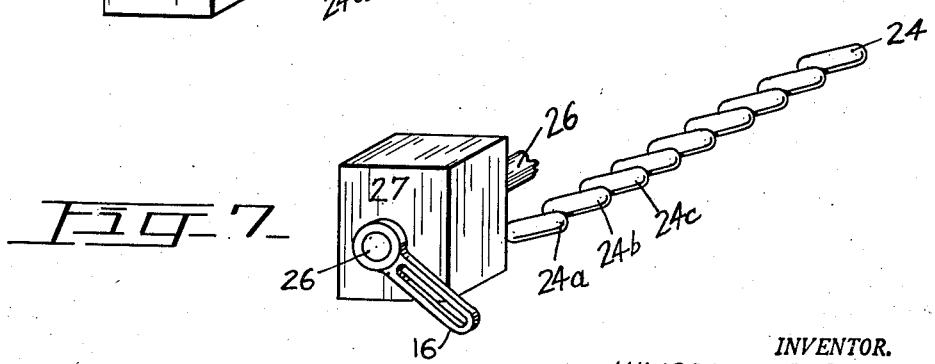

Patented May 18, 1948

2,441,726

UNITED STATES PATENT OFFICE 2,441,726

ELECTRIC AIR CIRCULATING HEATER

Ulysses G. Smith, Portland, Oreg.

Application May 25, 1946, Serial No. 672,244

8 Claims. (Cl. 219—39)

1

This invention relates in general to electric air-heating systems, and more specifically, to air-circulating heaters or furnaces in which the air in its passage through the heater is required to pass by or over electric heating elements or units by which the air is directly heated.

It is customary in air-circulating heaters of this general type to provide thermostatically controlled means, either for reducing the volume of heated air delivered by the heater or for reducing the amount of heat supplied by the heating elements, as the temperature of the room or building approaches the desired predetermined temperature for which the thermostat has been set.

I have found in many devices of this type that either the mechanism controlling the operation of the electric heating elements is very complicated and easily thrown out of adjustment or that the heating elements have a tendency to become overheated when the volume of air passing through or over them is reduced. The overheating of such elements, which I have found to be a fairly common occurrence, reduces the life of the heating elements.

One of the objects of this invention is to provide an electric air-circulating heater in which the volume or flow of air past a heating element will never fall below a safe minimum as long as electric current is being supplied to such element, thereby preventing any possible overheating of the element as the result of the flow of insufficient air past the element.

Another object of this invention is to provide a practical electric air heater having a plurality of heating elements in which the electric current to each element separately will be turned off or on automatically depending upon whether or not that particular heating element is needed at the time in producing the result desired for the heating system.

An additional object is to provide a simplified heater of the type indicated in which no intermediate variations in the amount of electric energy furnished to the heating elements will be necessary, but in which the electric current to each heating element will be either fully on or entirely off, as the case may be; thus eliminating the necessity for the inclusion of variable resistance means in the circuits to the heating elements.

A further object of this invention is to provide simple mechanical means for controlling the passage of air past each heating element individually without necessitating numerous variations

2 in speed of the blower fan by which air is caused to circulate through the heater.

A still further object of this invention is to provide an improved automatic electric air-circulating heater which will be simple and practical, inexpensive to manufacture, and easy to maintain in service.

These objects and incidental advantages I attain by arranging an air-controlling-and-directing damper in combination with a succession of separate heating elements and by coordinating the movement of the damper and the energizing of the separate heating elements by means of a common thermostatic control, and, in general, by constructing the members and parts of my air circulating heater as hereinafter briefly described with reference to the accompanying drawings.

In the drawings:

Fig. 2 is a fragmentary view, in perspective, of part of the air conduit showing the arrangement of the damper and heating elements, and also showing, more or less diagrammatically, the common, thermostatically operated, control means;

Fig. 3 is a fragmentary transverse section of the mercury switches and actuating cam elements associated with the thermostatic control, the section being indicated by the line 3—3 in Fig. 4;

Fig. 4 is a fragmentary side elevation of the same members shown in Fig. 3;

Fig. 5 is a fragmentary view, in perspective, of the switch-operating shaft driven by the thermostatically controlled motor, showing the associated mercury switches and the damper-actuating arm, when the damper is assumed to be fully open;

Figure 1:
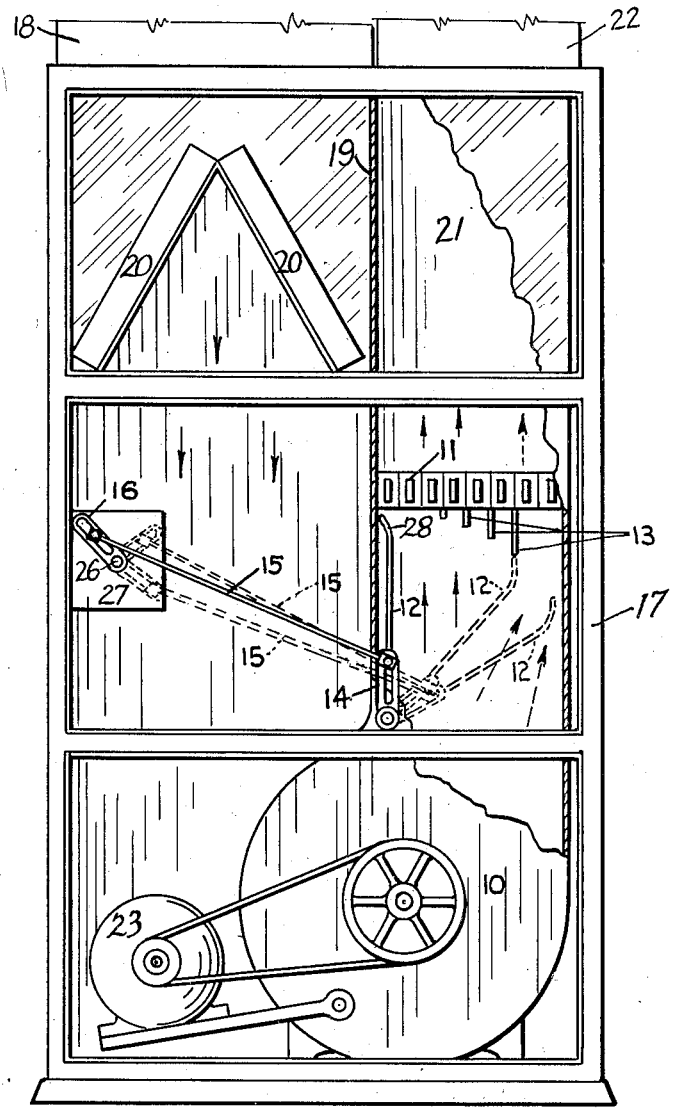
Fig. 1 is a side elevation of my heater with the panels of the outer casing removed and with a portion of the near side wall of the air conduit broken away to show the damper within the conduit.

Fig. 6 is a related fragmentary diagrammatic representation indicating the positions of the mercury switches during an adjusted position of the damper-actuating arm, or when the damper is only partly open; and Fig. 7 is a similar diagrammatic representation indicating the positions of the mercury switches and damper-actuating arm when the predetermined temperature has been obtained and no further heating is required for the time being.

Referring first to Fig. 1, my air circulating heater includes an outer housing or casing 17, preferably having removable panels or doors permitting easy access to the interior. The housing 17, as shown in Fig. 1, has three side panels, all of which have been removed. The incoming air is delivered through a suitable duct 18 to the top of the heater and passes downwardly through the heater to the left of the wall 19, of the conduit 21, and through the usual air filters 20. At the bottom of the heater the air is drawn into the blower 10 by which it is forced upwardly through the conduit 21, connected with the blower, to the delivery duct 22 leading from the top of the housing at the right. The blower 10 contains the usual fan driven by the motor 23.

A plurality of electric heating elements 11, (shown more clearly in Fig. 2), of standard and well-known construction, are mounted in horizontal spaced parallel position in the conduit 21 in the location shown in Figs. 1 and 2. Vertical fins or vanes extend transversely across the heating elements or strip heaters in the customary manner to provide greater heat conduction to the air in conduit 21 as it passes upwardly through the spaces defined by the heating elements. Each heating element 11 is connected to a source of electrical energy through the intermediary of a separate switch, such as an ordinary mercury switch. These mercury switches, one for each heating element 11 and one for the motor 23 of the blower 10, are diagrammatically indicated in Figs. 2 to 7, inclusive, by the reference character 24. These single-pole mercury switches 24 are tiltably mounted in the usual manner and are adapted to be tilted to either the off or on position by cam elements 25 mounted on a shaft 26. The shaft 26 is rotated through approximately 160° in either direction by a thermostatically-controlled motor (not shown), of customary construction, located within a housing 27, such as the motor manufactured by the Minneapolis-Honeywell Regulator Co., of Minneapolis, Minn., known as "M904." A slotted crank arm 16 is also secured on the shaft 26. The positions of the crank arm 16 in Figs. 5 and 7 illustrate the approximate crank arm position at the end of the rotational movement of the shaft 26 in either direction respectively. Similarly the position of the crank arm 16 in Fig. 6 illustrates the corresponding position when the shaft 26 has been rotated half way in either direction. The cam elements 25, on the shaft 26, are so arranged that as the shaft 26 is rotated counter-clockwise from the position indicated in Fig. 7 (which will be called the full "off" position) to the position indicated in Fig. 5 (which will be called the full "on" position) the mercury switches, beginning with the first on the left (thus in the order 24a, 24b, 24c, etc.) will successively be tilted into circuit closing position. Thus, when the shaft 26 has reached the half-way position indicated in Fig. 6, the first five mercury switches will have been closed, and when it reaches the limit of its counter-clockwise rotation, as indicated in Fig. 5, all the mercury switches will have been closed. Similarly, when the shaft 26 rotates clockwise from the position indicated in Fig. 5 the mercury switches consecutively are tilted to open or "off" position beginning with the first on the right, etc. The mercury switch designated 24a in Figs. 5 to 7 is connected to the blower motor 23. The mercury switch designated 24b is connected to the first heating element shown on the right in Fig. 2; switch 24c is connected to the second heating element from the right, and so on.

An air-directing damper or shutter 12 (Figs. 1 and 2) is hinged on the inside of the wall 19 of the conduit 21 below the heating elements 11. A slotted damper-arm 14 is secured to the outer end of a shaft which in turn is secured to the damper 12. A connecting rod 15 has its ends pivotally connected respectively to pivot blocks which are adjustably secured in the slots of the arms 14 and 16. Thus rotation of the shaft 26, producing movement of the arm 16, will produce movement of the damper 12. The exact amount of movement produced in the damper 12 by the rotation of the shaft 26 can be modified or adjusted by adjusting the positions of the pivot blocks on the arms 14 and 16 with which the rod 15 is connected. As apparent from Figs. 1 and 2, the damper 12 permits the air to flow past some or all of the heating elements 11, depending upon the position of the damper. Since the upper horizontal edge or free end of the damper moves over an arcuate path I provide several vertical guides or air duct dividers 13 extending downwardly below and between the heating elements 11 to direct the passage of the air more definitely when the damper 12 is in partly closed position.

The operation of my improved heater may now be briefly described. Let it be assumed at the start that the maximum amount of heating is required from the heater. Under such condition the thermostatically-controlled motor within the housing 27 will cause the shaft 26 to be rotated counter-clockwise (as viewed in the figures) to the position shown in Figs. 1 and 5. The damper 12 will be in the wide open position shown in full lines in Fig. 1, all the mercury, single-pole switches 24 will be closed, and all the elements 11 will be heated. Now let it be assumed that the temperature within the room or building, heated by the heater, is gradually rising and that, as a result, less and less heat will be required from the heater as the temperature approaches the predetermined amount for which the thermostat has been set. Under such conditions the thermostatically-controlled motor will now cause the shaft 26 to be rotated gradually in clockwise direction. The first result of such rotation of shaft 26 will be to cause the first of the mercury switches 24 (reading from right to left in Figs. 5 and 6) to be tilted to open or "off" position and thus cause the current to the first heating element on the left (as viewed in Fig. 1) to be shut off. As shaft 26 continues to rotate, the damper 12 will then be moved to a position midway between the first and the second heating elements (reading from left to right in Figs. 1 and 2). As the mercury switches one by one are tilted to "off" position and the corresponding heating elements cool off the damper follows the cooling of the consecutive elements and causes the air from the blower to be confined substantially to those elements which are still being heated. The partial closing of the damper will reduce the total amount of air given off by the heater to some extent and will also cause an increased current of air to be forced past the remaining elements which are being heated. Thus not only is there no danger of the heating elements becoming overheated as the damper gradually closes but, on the contrary, the increased flow of air past the remaining functioning heating elements renders any possibility of overheating them even more remote. If, instead of operating the damper 12, the rotation of shaft 26 were caused to reduce the speed of the blower motor 23, it will be apparent that there would then be serious danger of overheating the active heating elements and consequently it would be necessary to provide increased resistance or other means for cutting down the amount of electric energy supplied to such elements, which would require a more complicated and expensive apparatus.

After the shaft 26 has been rotated sufficiently to open the mercury switch (24b) to the last heating element, and all the heating elements are then inactive, the damper moves to its extreme closed position, shown in broken lines in Figs. 1 and 2, leaving only a very narrow slot for the air to pass through. At this point, however, the last mercury switch (24a) is tilted to "off" position, and, since this last switch is connected to the blower motor, the blower is shut off and the heater is entirely inactive until the thermostatically-controlled motor causes the shaft 26 to rotate in the opposite direction. With the rotation of shaft 26 in the opposite direction the reverse operation takes place. As the damper opens wider and wider more and more heating elements become active.

The upper edge or free end of the damper 12 is preferably curved upwardly for a slight distance, as shown at 28, since this curved edge reduces the tendency for air noise to occur as a result of the air blowing past the edge of the damper when the damper is not wide open.

Various modifications and substitutions could be made in the individual members or parts of my improved heater, without departing from the principle of my invention. It is not my intention to restrict my invention to the use of any particular types of elements, such as the mercury switches, for example, as referred to in this specification, or to limit the scope of my invention otherwise than as set forth in the claims. However, my heater, when constructed in the manner illustrated and described, I have found to be very satisfactory and I regard this as the preferred form of my invention.

I claim:

1. In an electric air circulating heater, a plurality of electric heating elements, means for connecting and disconnecting each of said elements separately with and from a source of electric energy, an air conduit, said heating elements located in said air conduit, an air entrance for said conduit, an air-directing damper in said conduit between said air entrance and said heating elements, said damper acting to direct the air in said conduit onto said heating elements selectively depending upon the movement of said damper, said damper operated by said means, whereby said means will change the positions of said damper when connecting and disconnecting each of said heating elements with and from a source of electric energy.

2. In an electric air circulating heater, a plurality of electric heating elements, automatic means for connecting and disconnecting each of said elements separately with and from a source of electric energy, an air conduit, said heating elements located in said air conduit, air-delivery means for causing air to pass through said conduit, an air-directing damper in said conduit between said air-delivering means and said heating elements, said damper acting to direct the air in said conduit onto said heating elements selectively depending upon the movement of said damper, said damper operated by said first-mentioned automatic means, whereby said first-mentioned means will change the positions of said damper when connecting and disconnecting each of said heating elements with and from a source of electric energy.

3. In an electric air circulating heater, a plurality of electric heating elements, thermostatically-controlled means for connecting and disconnecting each of said elements separately with and from a source of electric energy, an air conduit, said heating elements located in said air conduit, a blower for causing air to pass through said conduit, an air-directing damper in said conduit between said blower and said heating elements, said damper acting to direct the air in said conduit onto said heating elements selectively depending upon the movement of said damper, said damper connected with said thermostatically-controlled means, whereby the movement of said damper will be coordinated with the connecting and disconnecting of said heating elements with and from a source of electric energy, said damper, heating elements, and thermostatically-controlled means so arranged that air will be directed by said damper specifically onto those heating elements which are being energized and thus prevent the overheating of such elements.

4. In an electric air circulating heater of the character described, a plurality of electric heating elements, a motor, a shaft rotated by said motor, switches operated by the rotation of said shaft, said switches interposed between a source of electric energy and said heating elements respectively, an air conduit, said heating elements located in said air conduit, a fan for causing air to pass through said conduit, an air-directing damper in said conduit adjacent said heating elements and between said fan and said heating elements, said damper acting to direct the air in said conduit onto said heating elements selectively depending upon the movement of said damper, said damper connected with said shaft, whereby the movement of said damper will be coordinated with the connecting and disconnecting of said heating elements with and from a source of electric energy, said damper, heating elements, and switches so arranged that air will be directed by said damper specifically onto those heating elements which are being energized and thus prevent the overheating of such elements.

5. An electric air circulating heater of the character described including a plurality of electric heating elements, automatic means for connecting aid disconnecting each of said elements separately and consecutively with and from a source of electric energy, an air conduit, said heating elements located in said air conduit, air-delivery means for causing air to pass through said conduit, an air-directing damper in said conduit, between said air-delivering means and said heating elements, said damper acting to direct the air in said conduit onto said heating elements selectively depending upon the movement of said damper, said damper connected with said first-mentioned automatic means, whereby the movement of said damper will be coordinated with the connecting and disconnecting of said heating elements with and from a source of electric energy, said damper, heating elements, and first-mentioned automatic means so arranged that air will be directed by said damper specifically onto those heating elements which are being energized and thus prevent the overheating of such elements.

6. An electric air circulating heater of the character described including a plurality of electric heating elements, a thermostatically-controlled motor, a shaft rotated by said motor, switches operated by the rotation of said shaft, said switches interposed between a source of electric energy and said heating elements respectively, an air conduit, said heating elements located in said air conduit, air-delivery means for causing air to pass through said conduit, an air-directing damper in said conduit adjacent said heating elements and between said air-delivery means and said heating elements, said damper acting to direct the air in said conduit onto said heating elements selectively depending upon the movement of said damper, said damper connected with said shaft, whereby the movement of said damper will be coordinated with the connecting and disconnecting of said heating elements with and from a source of electric energy, said damper, heating elements, and switches so arranged that air will be directed by said damper specifically onto those heating elements which are being energized and thus prevent the overheating of such elements.

7. An electric air circulating heater of the character described including a plurality of electric heating elements, thermostatically-controlled means for connecting and disconnecting each of said elements separately with and from a source of electric energy, an air conduit, said heating elements located in said air conduit, a blower for causing air to pass through said conduit, an air-directing damper in said conduit adjacent said heating elements and between said blower and said heating elements, said damper acting to direct the air in said conduit onto said heating elements selectively depending upon the movement of said damper, said damper connected with said thermostatically-controlled means, whereby the movement of said damper will be coordinated with the connecting and disconnecting of said heating elements with and from a source of electric energy, said damper, heating elements, and thermostatically-controlled means so arranged that air will be directed by said damper specifically onto those heating elements which are being energized and thus prevent the overheating of such elements.

8. An electric air circulating heater of the character described including a plurality of electric heating elements, a thermostatically-controlled motor, a shaft rotated by said motor, mercury switches operated by the rotation of said shaft, said switches interposed between a source of electric energy and said heating elements respectively, an air conduit, said heating elements located in said air conduit, a fan for causing air to pass through said conduit, an air-directing damper in said conduit adjacent said heating elements and between said fan and said heating elements, said damper acting to direct the air in said conduit onto said heating elements selectively depending upon the movement of said damper, said damper connected with said shaft, whereby the movement of said damper will be coordinated with the connecting and disconnecting of said heating elements with and from a source of electric energy, said damper, heating elements, and switches so arranged that air will be directed by said damper specifically onto those heating elements which are being energized and thus prevent the overheating of such elements.

ULYSSES G. SMITH.

REFERENCES CITED

The following references are of record in the file of this patent:

UNITED STATES PATENTS

| Number | Name | Date |
|---|---|---|
| 2,058,252 | Parsons | Oct. 20, 1936 |